United States Patent
Piercy et al.

(10) Patent No.: US 11,914,332 B2
(45) Date of Patent: Feb. 27, 2024

(54) ADAPTIVE PID GAIN FOR A ZERO ORDER PROCESS

(71) Applicant: Schneider Electric Systems USA, Inc., Foxborough, MA (US)

(72) Inventors: William Brian Piercy, League City, TX (US); Randy Marvin Miller, Houston, TX (US)

(73) Assignee: Schneider Electric Systems USA, Inc., Foxborough, MA (US)

( * ) Notice: Subject to any disclaimer, the term of this patent is extended or adjusted under 35 U.S.C. 154(b) by 53 days.

(21) Appl. No.: 17/498,939

(22) Filed: Oct. 12, 2021

(65) Prior Publication Data

US 2022/0113684 A1 Apr. 14, 2022

Related U.S. Application Data

(60) Provisional application No. 63/091,161, filed on Oct. 13, 2020.

(51) Int. Cl.
*G05B 13/02* (2006.01)
*G05B 11/42* (2006.01)

(52) U.S. Cl.
CPC ............ *G05B 13/024* (2013.01); *G05B 11/42* (2013.01)

(58) Field of Classification Search
CPC .............................. G05B 13/024; G05B 11/42
See application file for complete search history.

(56) References Cited

U.S. PATENT DOCUMENTS

| | | |
|---|---|---|
| 4,768,143 A | 8/1988 | Lane et al. |
| 2003/0195641 A1 | 10/2003 | Wojsznis et al. |
| 2010/0204808 A1 | 8/2010 | Thiele |
| 2014/0084892 A1* | 3/2014 | Trautmann ............ H02M 3/157 323/285 |
| 2015/0185714 A1* | 7/2015 | Geveci ................. G05B 13/021 700/52 |
| 2016/0282822 A1 | 9/2016 | Perez et al. |
| 2022/0231597 A1* | 7/2022 | Zhang ................... H02M 3/157 |

OTHER PUBLICATIONS

International Search Report and Written Opinion dated Jan. 19, 2022 for corresponding International Patent Application No. PCT/US2021/054557, 12 pages.

\* cited by examiner

*Primary Examiner* — Thomas C Lee
*Assistant Examiner* — Tyler Dean Hedrick
(74) *Attorney, Agent, or Firm* — Locke Lord LLP

(57) ABSTRACT

Systems and methods for adaptively tuning a Proportional, Integral and Derivative (PID) controller in a zero order industrial process are provided. A method and system can involve receiving input data at one or more inputs of the PID controller and generating output data at one or more outputs of the PID controller in response to processing the input data. Error(s) associated with the controller are determined based on an analysis of a measured parameter with respect to a desired setpoint. The measured parameter may be indicated in the output data. Adaptive gain may be applied to the PID controller in response to the absolute value of the controller error both exceeding a deadband and increasing. Additionally, normal gain, which is lower than the adaptive gain, may be applied to the PID controller in response to the absolute value of the controller error either being below the deadband or decreasing.

20 Claims, 4 Drawing Sheets

ADAPTIVE PID GAIN FOR A ZERO ORDER PROCESS

RELATED APPLICATION

The present application claims priority to U.S. Provisional Patent Application Ser. No. 63/091,161, filed Oct. 13, 2020. The disclosure of the above-identified prior U.S. Patent Application, in its entirety, is considered as being part of the present application, and thus, is incorporated herein by reference.

FIELD

This disclosure relates generally to systems and methods for adaptively tuning a controller, and more particularly, to systems and methods for adaptively tuning a Proportional, Integral and Derivative (PID) controller in a zero order process.

BACKGROUND

As is known, controllers are used in a variety of applications and take various forms. One example type of controller is a PID controller which may use control loop feedback to control process variables. The PID controller may be utilized, for example, in an industrial control application or process (hereinafter, referred to as "industrial process" for simplicity) to regulate temperature, flow, pressure, speed and other process variables.

SUMMARY

In accordance with embodiments, a method and system are provided for adaptively tuning a Proportional, Integral and Derivative (PID) controller in a zero order industrial process. The method and system can involve: receiving input data at one or more inputs of the PID controller; generating output data at one or more outputs of the PID controller in response to processing the input data; determining controller error based on an analysis of a measured parameter with respect to a desired setpoint, the measured parameter indicated in the output data; applying adaptive gain to the PID controller in response to the absolute value of the controller error exceeding a deadband and increasing; and applying normal gain, which is lower than the adaptive gain, to the PID controller in response to the absolute value of the controller error being at or below the deadband or decreasing. The adaptive gain may be a high controller gain, and the normal gain may be a low controller gain. The adaptive gain also may be a fixed gain.

In various embodiments, the method and system can further involve changing a controller gain to be applied by the PID controller to the adaptive gain in response to the absolute value of the controller error exceeding a deadband and increasing; or changing a controller gain to be applied by the PID controller to the normal gain in response to the absolute value of the controller error being below the deadband or decreasing.

In various embodiments, the normal gain can be applied by the PID controller in response to the absolute value of the controller error decreasing. In the method and system, the operations of receiving input data, generating output data, determining controller error, applying adaptive gain and applying normal gain also may be repeated in response to an updated status and/or condition with respect to at least one load or process associated with the zero order industrial process, or in response to a user request or command.

BRIEF DESCRIPTION OF THE DRAWINGS

The foregoing features of the disclosure, as well as the disclosure itself may be more fully understood from the following detailed description of the drawings, in which.

DETAILED DESCRIPTION

Figure 1:
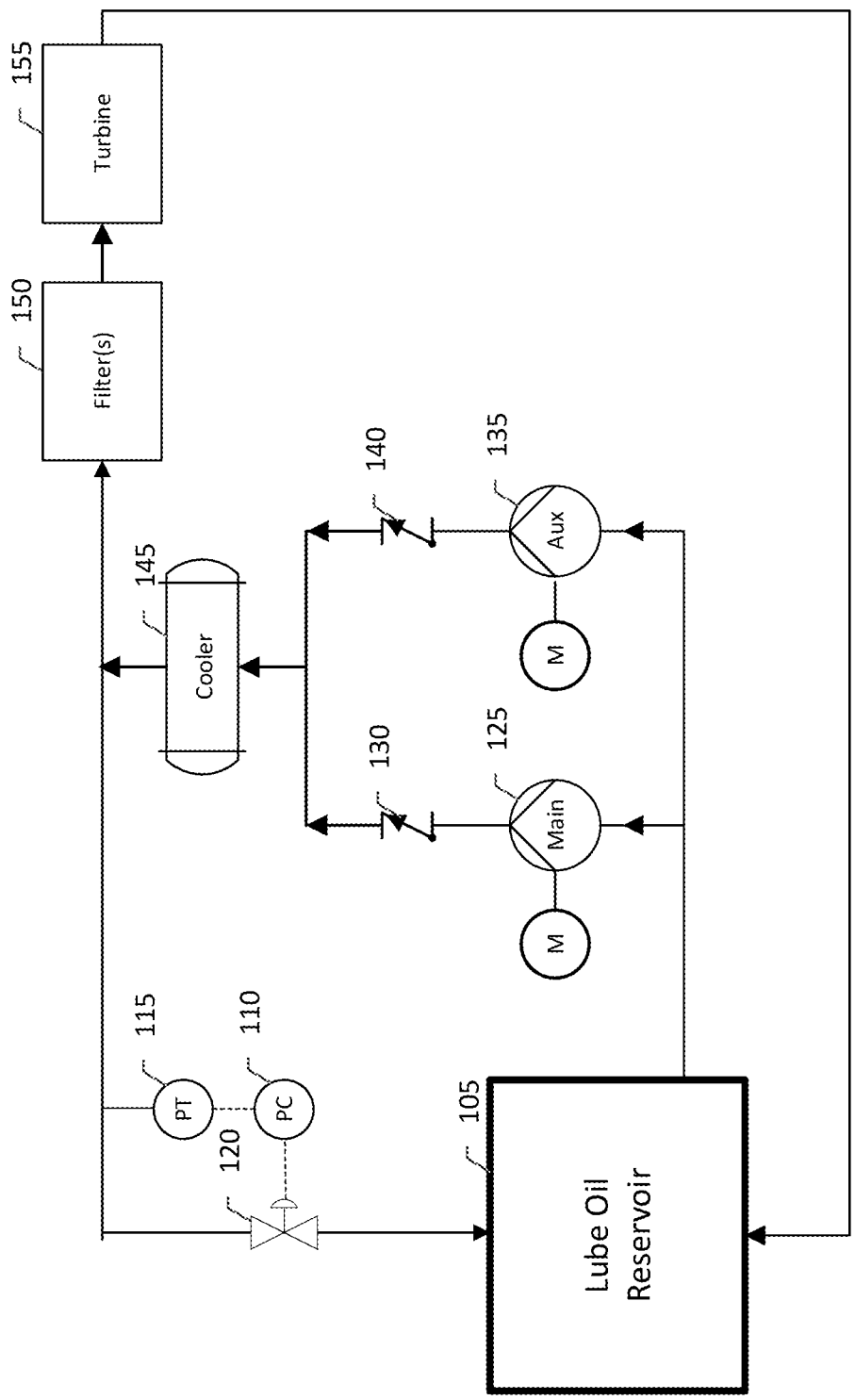
FIG. 1 shows an example lube oil system that may utilize the disclosed systems and methods in accordance with embodiments of the disclosure.

Described herein are systems and methods related to adaptively tuning of a controller. The controller may be a PID controller utilized in an industrial process, for example. The industrial process may correspond to a zero order industrial process (or a substantially zero order industrial process) in accordance with some aspects of this disclosure.

In accordance with embodiments of this disclosure, a zero order process is a process where an input change results in an immediate (or substantially immediate) output change with no (or substantially no) time delay. An example of a zero order industrial process is lubricating oil pressure for a steam turbine. Another example of a zero order industrial process is sealing oil pressure for a compressor. Since the responses of these processes (and other types of zero order industrial processes) are very quick, the processes typically do not respond well to the gain action of a PID controller. Any significant amount of gain will cause the systems (e.g., the steam turbine and/or compression systems) to constantly oscillate. Therefore, for these systems, conventional PID controllers must be tuned with very low gain (almost none). The integral action is the primary control action. For small upsets and steady state operation, the system response is generally acceptable. However, if there is a sudden sizable upset, such as starting or stopping an auxiliary pump where the flow suddenly doubles or halves, a higher gain action is required to properly respond to the upset. This higher gain action will be referred to as adaptive gain. Although the adaptive gain action initially provides the correct response to the upset, the system will not settle out and will maintain steady state oscillation.

The systems and methods disclosed herein define an adaptive gain strategy that can properly respond to a sizeable upset but also remain stable in steady state operation. More particularly, in one aspect of this disclosure, a method for adaptively tuning a PID controller in a zero order industrial process is provided. The method includes receiving input data at one or more inputs of the PID controller and generating output data at one or more outputs of the PID controller in response to processing the input data. Error(s) associated with the controller are determined, for example, based on an analysis (e.g., comparison) of a measured parameter with respect to a desired setpoint. The measured parameter may be indicated in the output data, for example.

Adaptive gain may be selectively applied to the PID controller, such as for example in response to the absolute value of the controller error both exceeding a deadband and increasing (i.e., the measurement moving away from the setpoint). Additionally, normal gain may be applied to the PID controller in response to the absolute value of the controller error being below the deadband or decreasing (i.e., the measurement is moving towards setpoint). The adaptive gain may be a high or higher (e.g., greater, larger, etc.) gain than the normal gain which is a low or lower gain. The adaptive gain may be a fixed gain.

In accordance with embodiments of this disclosure, by only applying high gain when the absolute value of the error is outside of a deadband and increasing (e.g., due to the adaptive gain being a function of the controller error and direction of the error), the controller is able to respond aggressively to large upsets while maintaining stable operation during steady state conditions.

As illustrated above, and as will be appreciated from the discussions below, the disclosed systems and methods provide a unique form of adaptive gain for tuning a controller (e.g., a PID controller) that is intended to be used, for example, on a process with a zero order time constant. With this special adaptive gain, the controller will be able to respond appropriately to a large upset and also remain stable during steady conditions. In accordance with embodiments of this disclosure, a process with a time constant less than a few seconds (and possibly other processes) will benefit from the disclosed systems and methods.

In addition to hydraulic processes, the following processes also could fall in the category of a zero order system (i.e. processes possessing a low time constant) and could benefit from the systems and methods described herein. These other processes can include pressure control for a compressible gas that has a low system volume to flow ratio, power control for a steam or gas turbine driven generator, flow control for either an incompressible or compressible fluid, and so forth.

In various embodiments, the gain of a PID controller can be adjusted by adjusting PID parameters. For example, in a zero order process, gain parameters (e.g., Proportional Gain parameter Kp or Integral Gain parameter Ki, etc.) can be adjusted or changed to provide a normal (or low) gain or an adaptive (or high) gain for a PID controller. In a zero order process, the PID controller also can be configured to have a Derivative Gain parameter Kd set to zero (e.g., Kd=0 or the like) to perform, for example, PI control. Furthermore, depending on the application, the difference in the magnitude of the adaptive gain and normal gain can vary (e.g., (e.g., 2 times (x) larger, 10 times (x) larger or 1 order of magnitude, etc.). For example the quicker the process time constant, a smaller setting for Kp (normal) may be used. The larger the valve flow capacity or capacity of other types of process components to be controlled, the smaller the setting for Kp (adaptive) may be used. Accordingly, the adaptive and normal gains can be based on the process time constant and other factors associated with the process or system to be controlled.

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

FIG. 1 illustrates an example lube oil system for controlling lubrication of a turbine 155 in accordance with embodiments of this disclosure. As illustrated in FIG. 1, the example lube oil system includes a lube oil reservoir 105, a controller (e.g., PID controller) 110, a pressure transmitter 115, and a switching device 120. The lube oil system also includes a main pump 125, a non-return valve 130, an auxiliary pump (e.g., backup pump) 135, and a non-return valve 140. The lube oil system further includes a cooling device (e.g., a heat exchanger) 145, one or more filters (e.g., for filtering the oil) 150 and the turbine 155. The turbine 155 may correspond to a gas, steam, hydroelectric, wind, or nuclear turbine, for example. In accordance with embodiments of this disclosure, the turbine 155 may be associated with an oil and/or gas operation or power distribution system.

During operation of the lube oil system, the main pump 125 and/or the auxiliary pump 135 supply oil (e.g., hydraulic oil) being pumped from the reservoir 105 to the downstream turbine 155. The pressure is controlled by controlling the flow rate of oil back to the reservoir 105. For example, increasing the flow back to the reservoir 105 will reduce the pressure in the line to the turbine 155. In accordance with embodiments of this disclosure, the auxiliary pump 135 is used if the pressure gets too low. When the auxiliary pump 135 turns on, there is an immediate increase in pressure through the cooling device 145 to the line to the turbine 155. The controller 110, which may be implemented as a back pressure controller, must respond quickly to the load change (pressure increase). This is where the systems and methods contemplated in accordance with embodiments of this disclosure may be implemented, for example, to prevent the turbine 155 from getting damaged (and possibly preventing other hazardous conditions), as further discussed in connection with figures below.

It is understood that in addition to failure of the main pump 125 resulting in the load change (pressure increase), the load change may be caused by an operator of the lube oil system cycling the auxiliary pump 135 on and off (e.g., at regular testing intervals to confirm the auxiliary pump 135 is operating correctly). In particular, during these times there is also a large pressure swing both when stopping and starting the auxiliary pump 135. When stopping the auxiliary pump 135, the pressure can dip close to the trip point.

Figure 2:
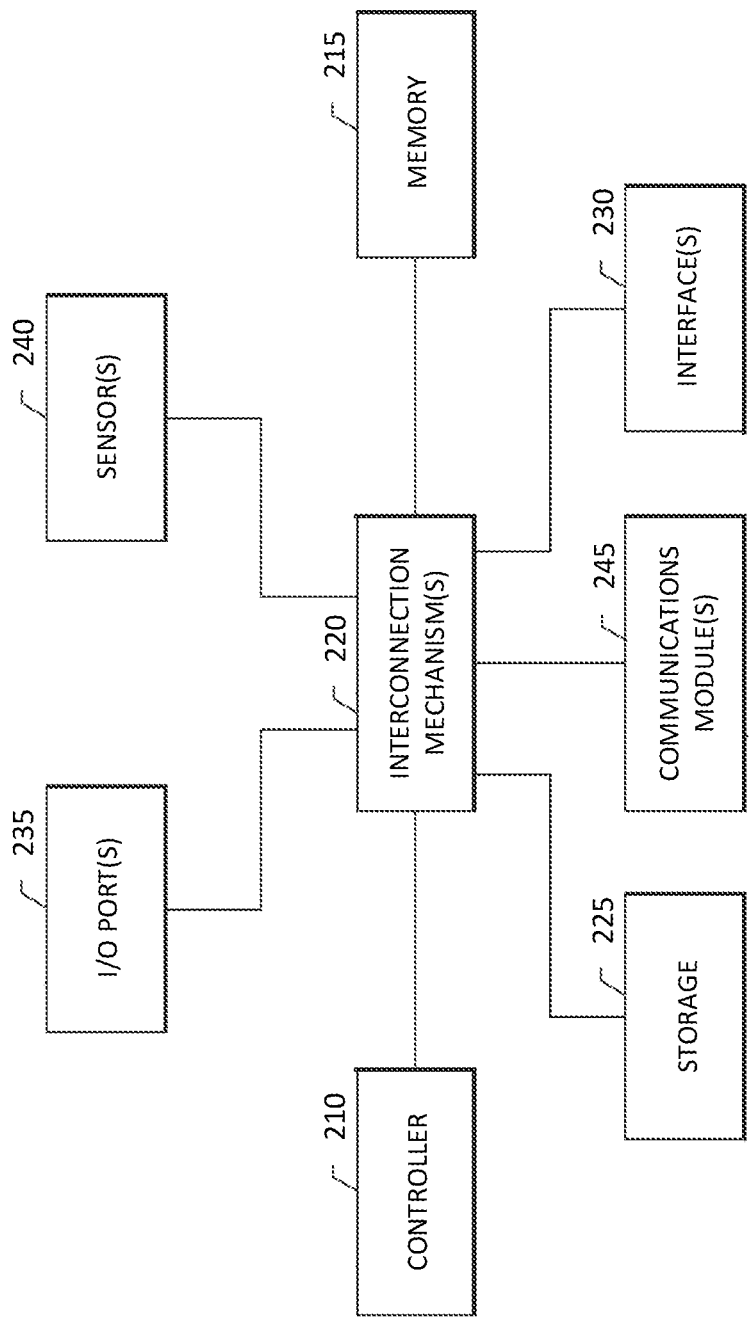
FIG. 2 shows an example system including a PID controller in accordance with embodiments of the disclosure, the system capable of being used in the lube oil system shown in FIG. 1, for example.

Referring to FIG. 2, an example system including a PID controller 210 that may be suitable for use in the lube oil system shown in FIG. 1 is illustrated. The system includes the PID controller 210, a memory device 215, storage 225, and an interface 230. The system also includes an input-output (I/O) port 235, a sensor 240, a communication module 245, and an interconnection mechanism 220 for communicatively coupling two or more system components 210-245.

The memory device 215 may include volatile memory, such as DRAM or SRAM, for example. The memory device 215 may store programs and data collected during operation of the system. For example, in embodiments in which the system shown in FIG. 2 is configured to monitor or measure one or more parameters (e.g., pressure) associated with the lube oil system shown in FIG. 1, the memory device 215 may store the monitored parameters.

The storage system 225 may include a computer readable and writeable nonvolatile recording medium, such as a disk or flash memory, in which signals are stored that define a program to be executed by the controller 210 or information to be processed by the program. The controller 210 may control transfer of data between the storage system 225 and the memory device 215 in accordance with known computing and data transfer mechanisms. In embodiments, the parameters monitored or measured by the system may be stored in the storage system 225.

The I/O port 235 can be used to couple devices (e.g., pumps) to the system shown in FIG. 2, and the sensor 240 can be used to monitor or measure the parameters associated with the lube oil system shown in FIG. 1. The I/O port 235 can also be used to coupled external devices, such as sensor devices (e.g., temperature and/or pressure sensor devices) and/or user input devices (e.g., local or remote computing devices) (not shown), to the system. The I/O port 235 may further be coupled to one or more user input/output mechanisms, such as buttons, displays, acoustic devices, etc., to provide alerts (e.g., to display a visual alert, such as text and/or a steady or flashing light, or to provide an audio alert, such as a beep or prolonged sound) and/or to allow user interaction with the system. Although the sensor 240 is shown in this example as being connected directly to the interconnection mechanism 220, the sensor 240 may instead be communicatively connected to the interconnection mechanism 220 such as via the I/O port 235.

The communication module 245 may be configured to couple the system shown in FIG. 2 to one or more external communication networks or devices. These networks may be private networks within a building in which the system is installed, or public networks, such as the Internet. In embodiments, the communication module 245 may also be configured to couple the system to a cloud-connected hub, or to a cloud-connected central processing unit, associated with a system (e.g., lube oil system) including the system shown in FIG. 2.

In embodiments, the parameters monitored or measured by the system shown in FIG. 2 may be received at an input of the controller 210 as input data, and the controller 210 may process the measured parameters to generate output data or signals at an output thereof. In embodiments, the controller output data or signals may correspond to an output of the system shown in FIG. 2. The output data or signals may be provided at I/O port(s) 235, for example. In embodiments, the output data or signals may be received by a cloud-connected central processing unit, for example, for further processing and/or by equipment to which the system is coupled (e.g., for controlling one or more parameters associated with the equipment). In one example, the system may include an interface 230 for displaying visualizations indicative of the output data or signals. The interface 230 may correspond to a graphical user interface (GUI) in embodiments.

Components of the system may be coupled together by the interconnection mechanism 220, which may include one or more busses, wiring, or other electrical connection apparatus. The interconnection mechanism 220 may enable communications (e.g., data, instructions, etc.) to be exchanged between system components.

It is understood that system shown in FIG. 2 is but one of many potential configurations of systems including PID controllers that be utilized with the systems and methods disclosed herein.

Figure 3:
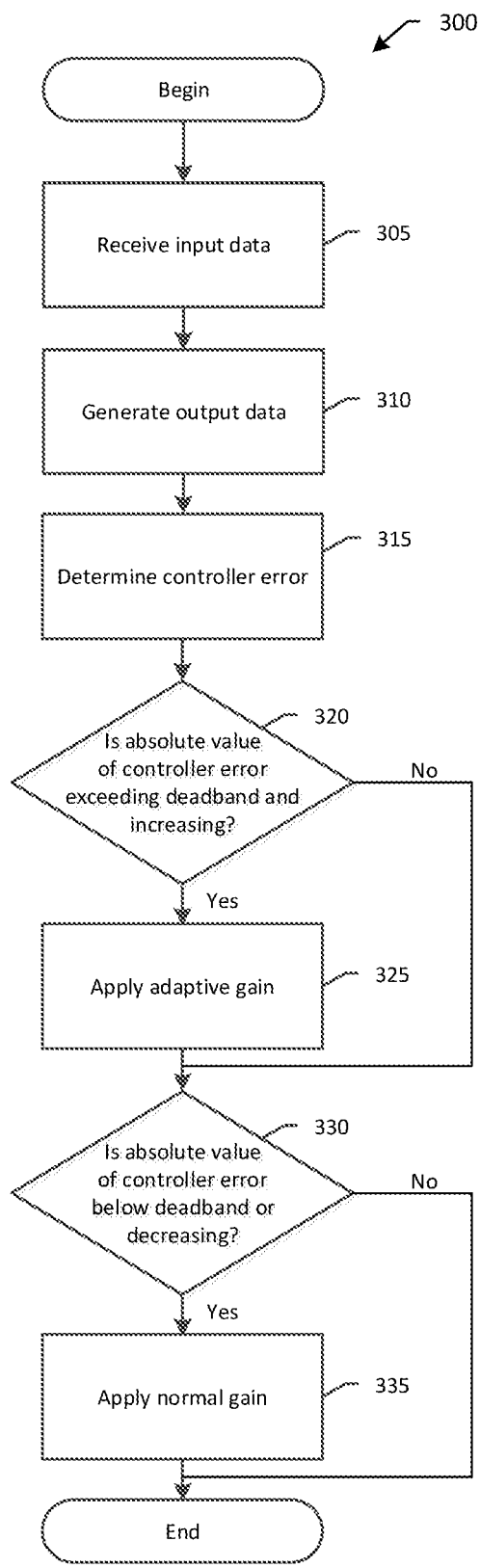
FIG. 3 is a flowchart illustrating an example implementation of a method for adaptively tuning a PID controller in accordance with embodiments of the disclosure.

Referring to FIG. 3, a flowchart (or flow diagram) is shown to illustrate an example implementation of a method 300 for adaptively tuning a PID controller in accordance with embodiments of the disclosure. Rectangular elements (typified by element 305 in FIG. 3), as may be referred to herein as "processing blocks," may represent computer software and/or algorithm instructions or groups of instructions. Diamond shaped elements (typified by element 325 in FIG. 3), as may be referred to herein as "decision blocks," represent computer software and/or algorithm instructions, or groups of instructions, which affect the execution of the computer software and/or algorithm instructions represented by the processing blocks. The processing blocks and decision blocks can represent steps performed by functionally equivalent circuits such as a digital signal processor circuit or an application specific integrated circuit (ASIC).

The flowchart does not depict the syntax of any particular programming language. Rather, the flowchart illustrates the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied. Thus, unless otherwise stated, the blocks described below are unordered; meaning that, when possible, the blocks can be performed in any convenient or desirable order including that sequential blocks can be performed simultaneously and vice versa. It will also be understood that various features from the flowchart described below may be combined in some embodiments. Thus, unless otherwise stated, features from the flowchart described below may be combined with other features of the flowchart described below (and/or other features as will be apparent to one of ordinary skill in the art), for example, to capture the various advantages and aspects of systems and methods associated with adaptively tuning a PID controller sought to be protected by this disclosure.

As illustrated in FIG. 3, the method 300 begins at block 305 where input data is received at one or more inputs of the PID controller (e.g., 110, shown in FIG. 1). The input data may include, for example, pressure information received from a pressure transmitter (e.g., 115, shown in FIG. 1). At block 310, output data is generated at one or more outputs of the PID controller in response to processing the input data. The output data may indicate load changes (e.g., pressure increases or decreases), for example.

At block 315, a controller error is determined based on an analysis (e.g., comparison) of a measured parameter (e.g., pressure) with respect to a desired setpoint (e.g., desired pressure). In accordance with some embodiments of this disclosure, the measured parameter is indicated in the output data.

At block 320, it is determined if the absolute value of the controller error exceeds a deadband and is increasing (i.e., the measurement, e.g., pressure, is moving away from the setpoint). If it is determined the absolute value of the controller error both exceeds a deadband and is increasing, the method proceeds to block 325 where adaptive gain is applied to the PID controller. For example, the controller gain to be applied for the PID controller may be selectively changed (or adjusted) to the adaptive gain in response to the absolute value of the controller error exceeding the deadband and increasing. The controller gain may be maintained at the adaptive gain so long as the condition persists (e.g., the absolute value of the controller error exceeds the deadband and is increasing). Alternatively, if it is determined the absolute value of the controller error does not exceed a deadband and is not increasing, the method proceeds to block 330.

At block 330, it is determined if the absolute value of the controller error is below the deadband or is decreasing (i.e., the measurement, e.g., pressure, is moving towards the setpoint). If it is determined the absolute value of the controller error is below the deadband or is decreasing, the method proceeds to block 335 where normal gain is applied to the PID controller. For example, the controller gain to be applied for the PID controller is selectively changed (or adjusted) to the normal gain in response to the absolute value of the controller error being at or below the deadband or decreasing. The controller gain may be maintained at the normal gain so long as the condition persists (e.g., the absolute value of the controller error is at or below the deadband or decreasing). Alternatively, if it is determined the absolute value of the controller error is not below the deadband or is not decreasing, the method 300 ends.

In some embodiments, the method 300 may repeat or be initiated again in response to user input and/or a control signal, for example. The control signal may be generated, for example, in response to an updated status and/or condition with respect to a load, loads, process, processes, etc. associated with the system.

It is understood that method 300 may include one or more additional and/or alternative blocks or steps in some embodiments.

Figure 4:
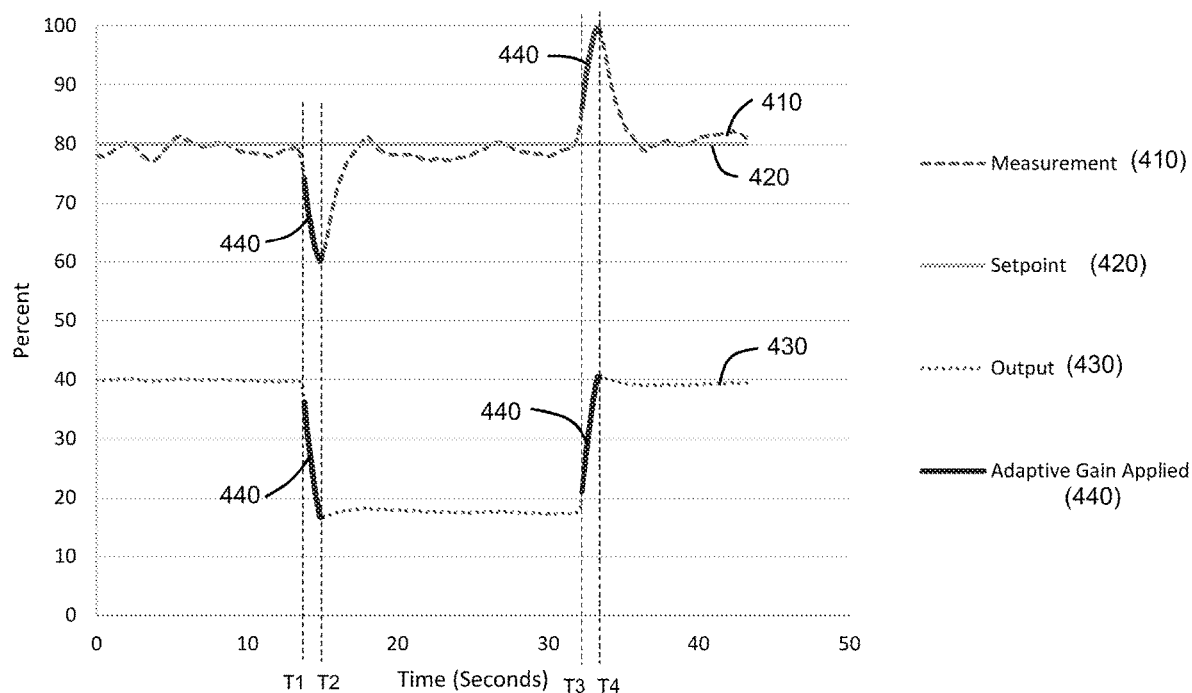
FIG. 4 is a graph illustrating an example implementation of a controller response and application of an adaptive gain in accordance with embodiments of the disclosure.

FIG. 4 illustrates a graph 400 of an example controller response and application of the adaptive gain for a controller, such as a PID controller, in accordance with embodiments. For the purposes of explanation, this example will be described with reference to the lube oil pump system of FIG. 1. The graph 400 shows example data, including measurement 410, set point 420 and output 430 associated with a PID controller for the lube oil pump system over time, along with when adaptive gain is applied (as shown by the line 440) instead of normal gain, for example.

For example, when operating the lube oil pump system, stopping the auxiliary pump 135 will cause a disturbance that drops the lube oil pressure below setpoint as seen by pressure sensor 115. When the pressure drops below a configurable deadband (e.g., around time T1), the gain of the controller is substantially increased to an adaptive gain which causes the pump bypass valve to rapidly close as the pressure continues to fall. Once the drop in pressure is halted (e.g., around time T2), the gain is returned to its normally low value or normal gain. This is important and specifically applies to a zero order system because the controller output to the valve will be approximately at the same position as the pressure returns to setpoint. If a high gain is applied as the pressure is returning to setpoint, the controller output would tend to open the valve back up and impede the pressure returning to setpoint.

Similarly when re-starting the auxiliary pump 135, the lube oil pressure may quickly rise above setpoint (e.g., around time T3). Adaptive gain is applied while the lube oil pressure is above the deadband and the pressure is continuing to rise. Once the increase in pressure is halted, the gain is returned to its normally low valve (e.g., around time T4).

It is to be appreciated that the concepts, systems, circuits and techniques sought to be protected herein are not limited to use in the example applications described herein (e.g., turbomachinery applications) but rather, may be useful in substantially any application where it is desired to adaptively tune a PID controller. While particular embodiments and applications of the present disclosure have been illustrated and described, it is to be understood that embodiments of the disclosure not limited to the precise construction and compositions disclosed herein and that various modifications, changes, and variations can be apparent from the foregoing descriptions without departing from the spirit and scope of the disclosure as defined in the appended claims.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

The various embodiments disclosed herein may be implemented as a system, method or computer program product or a combination thereof. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. A method for adaptively tuning a Proportional, Integral and Derivative (PID) controller in a zero order industrial process, the method comprising:
   receiving input data at one or more inputs of the PID controller;
   generating output data at one or more outputs of the PID controller in response to processing the input data;
   determining controller error based on an analysis of a measured parameter with respect to a desired setpoint, the measured parameter indicated in the output data;
   applying adaptive gain to the PID controller in response to the absolute value of the controller error exceeding a deadband and increasing; and
   applying normal gain, which is lower than the adaptive gain, to the PID controller in response to the absolute value of the controller error being at or below the deadband or decreasing.

2. The method of claim 1, further comprising:
   changing a controller gain to be applied by the PID controller to the adaptive gain in response to the absolute value of the controller error exceeding a deadband and increasing; or
   changing a controller gain to be applied by the PID controller to the normal gain in response to the absolute value of the controller error being below the deadband or decreasing.

3. The method according to claim 1, wherein the normal gain is applied by the PID controller in response to the absolute value of the controller error decreasing.

4. The method according to claim 1, wherein the operations of receiving input data, generating output data, determining controller error, applying adaptive gain and applying normal gain are repeated in response to an updated status and/or condition with respect to at least one load or process associated with the zero order industrial process.

5. The method according to claim 1, wherein the operations of receiving input data, generating output data, determining controller error, applying adaptive gain and applying normal gain are repeated in response to a user request or command.

6. The method according to claim 1, wherein the adaptive gain is a fixed gain.

7. The method according to claim 1, wherein the adaptive or normal gain is applied to regulate one or more process variables of the industrial process, and the one or more process variables comprises at least one of temperature, flow, pressure and speed of the industrial process.

8. The method according to claim 1, wherein the adaptive and normal gains are based on at least a process time constant of the industrial process.

9. A system for controlling a zero order industrial process, comprising:
   a Proportional, Integral and Derivative (PID) controller configured to:
      receive input data;
      generate output data in response to processing the input data;
      determine controller error for the PID controller based on an analysis of a measured parameter with respect to a desired setpoint, the measured parameter indicated in the output data;
      apply an adaptive gain to the PID controller in response to the absolute value of the controller error exceeding a deadband and increasing, and
      apply normal gain, which is lower than the adaptive gain, to the PID controller in response to the absolute value of the controller error being at or below the deadband or decreasing.

10. The system of claim 9, wherein the PID controller is further configured to:
    change a controller gain to be applied by the PID controller to the adaptive gain in response to the absolute value of the controller error exceeding a deadband and increasing; or
    change a controller gain to be applied by the PID controller to the normal gain in response to the absolute value of the controller error being below the deadband or decreasing.

11. The system according to claim 9, wherein the normal gain is applied by the PID controller in response to the absolute value of the controller error decreasing.

12. The system according to claim 9, wherein the PID controller is further configured to repeat the operations of receiving input data, generating output data, determining controller error, applying adaptive gain and applying normal gain in response to an updated status and/or condition with respect to at least one load or process associated with the zero order industrial process.

13. The system according to claim 9, wherein the PID controller is further configured to repeat the operations of receiving input data, generating output data, determining controller error, applying adaptive gain and applying normal gain in response to a user request or command.

14. The system according to claim 9, wherein the adaptive gain is a fixed gain.

15. A non-transitory computer readable medium storing computer code, which when executed by one or more processor, performs a process of adaptively tuning a Proportional, Integral and Derivative (PID) controller in a zero order industrial process, the process comprising:
    receiving input data at one or more inputs of the PID controller;
    generating output data at one or more outputs of the PID controller in response to processing the input data;
    determining controller error based on an analysis of a measured parameter with respect to a desired setpoint, the measured parameter indicated in the output data;
    applying adaptive gain to the PID controller in response to the absolute value of the controller error exceeding a deadband and increasing; and
    applying normal gain, which is lower than the adaptive gain, to the PID controller in response to the absolute value of the controller error being at or below the deadband or decreasing.

16. The non-transitory computer readable medium of claim 15, wherein the process further comprises:
    changing a controller gain to be applied by the PID controller to the adaptive gain in response to the absolute value of the controller error exceeding a deadband and increasing; or changing a controller gain to be applied by the PID controller to the normal gain in response to the absolute value of the controller error being below the deadband or decreasing.

17. The non-transitory computer readable medium according to claim 15, wherein the normal gain is applied by the PID controller in response to the absolute value of the controller error decreasing.

18. The non-transitory computer readable medium according to claim 15, wherein the process further repeats the operations of receiving input data, generating output data, determining controller error, applying adaptive gain and applying normal gain in response to an updated status and/or condition with respect to at least one load or process associated with the zero order industrial process.

19. The non-transitory computer readable medium according to claim 15, wherein the process further repeats the operations of receiving input data, generating output data, determining controller error, applying adaptive gain and applying normal gain in response to a user request or command.

20. The non-transitory computer readable medium according to claim 15, wherein the adaptive gain is a fixed gain.

* * * * *